United States Patent
Tamura et al.

(10) Patent No.: US 9,690,995 B2
(45) Date of Patent: Jun. 27, 2017

(54) IMAGE PROCESSING APPARATUS

(71) Applicant: FUJI JUKOGYO KABUSHIKI KAISHA, Tokyo (JP)

(72) Inventors: Yuichiroh Tamura, Tokyo (JP); Kensaku Natsume, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 63 days.

(21) Appl. No.: 14/742,418

(22) Filed: Jun. 17, 2015

(65) Prior Publication Data

US 2015/0371093 A1 Dec. 24, 2015

(30) Foreign Application Priority Data

Jun. 18, 2014 (JP) ................ 2014-125142

(51) Int. Cl.
*G06K 9/00* (2006.01)
*G06T 7/593* (2017.01)
*G06T 7/12* (2017.01)

(52) U.S. Cl.
CPC ............ *G06K 9/00798* (2013.01); *G06T 7/12* (2017.01); *G06T 7/593* (2017.01); *G06T 2207/10028* (2013.01); *G06T 2207/30256* (2013.01)

(58) Field of Classification Search
CPC .................. G06K 9/00798; G06T 2207/10028
See application file for complete search history.

(56) References Cited

U.S. PATENT DOCUMENTS

| | | | | |
|---|---|---|---|---|
| 2009/0167864 A1* | 7/2009 | Unoura | ........ | G06K 9/00798 348/148 |
| 2009/0245582 A1* | 10/2009 | Sakamoto | ........ | G06K 9/00798 382/104 |
| 2009/0284597 A1* | 11/2009 | Nakamori | ........ | G06K 9/00798 348/148 |
| 2010/0054538 A1* | 3/2010 | Boon | ........ | G06K 9/00798 382/104 |
| 2012/0154588 A1* | 6/2012 | Kim | ........ | G06K 9/4633 348/148 |
| 2012/0194677 A1* | 8/2012 | Suzuki | ........ | G06K 9/00798 348/148 |
| 2015/0195500 A1* | 7/2015 | Usui | ........ | H04N 9/735 348/148 |

FOREIGN PATENT DOCUMENTS

| | | |
|---|---|---|
| JP | 4365350 B2 | 11/2009 |
| JP | 2012-066759 A | 4/2012 |

* cited by examiner

*Primary Examiner* — Oneal R Mistry

(74) *Attorney, Agent, or Firm* — McDermott Will & Emery LLP

(57) ABSTRACT

For a lane line search range set in a captured image obtained through imaging of the travel direction of a vehicle, a first lane line detection process detects a lane line based on a luminance image for more than half of rows within the search range, and detects a lane line based on a color difference image for the other rows, while a second lane line detection process detects a lane line based on the color difference image for a greater number of rows than in the first process. Then, a mode switchover control process performs mode switchover determination between the first and second modes based on the number of rows where a lane line of a predefined width or wider has been detected, from among the rows where a lane line has been detected, and performs mode switchover control based on the determination result.

12 Claims, 8 Drawing Sheets

IMAGE PROCESSING APPARATUS

CROSS-REFERENCE TO RELATED APPLICATIONS

The present application claims priority from Japanese Patent Application No. 2014-125142 filed on Jun. 18, 2014, the entire contents of which are hereby incorporated by reference.

BACKGROUND

1. Technical Field

The present invention relates to the technical field of image processing apparatuses that detect a lane line projected as a subject, on the basis of a captured image that is obtained through imaging of the direction of travel of a vehicle with the apparatus.

2. Related Art

Vehicle systems that recognize a vehicle exterior environment include systems that recognize a subject on the basis of a captured image that is obtained through stereo-imaging of the direction of travel of a vehicle equipped the system by a pair of cameras. Systems which recognize thus a subject that is present in the direction of travel of the vehicle include systems that generate three-dimensional position information (information on the position in actual space) on the subject, including information on the distance up to the subject. In such systems, specifically, captured images of different viewpoints are obtained through stereo-imaging, the parallax of the subject is calculated on the basis of the captured images, and three-dimensional position information on the subject is generated on the basis of the parallax.

Recognition schemes of the vehicle exterior environment include schemes that detect lane lines that are formed on a road surface, such as white lane lines, and detect curves present in the direction of travel the gradient of the road surface, on the basis of a three-dimensional model of the lane lines.

Lane line detection is typically accomplished on the basis of luminance images, by exploiting a comparatively large difference between the road surface and white lane lines.

As used herein, the term "lane line" denotes a line that represents a boundary between traveling lanes, and that is formed by paint or the like, on the road surface.

Lane lines also include colored lane lines such as orange lane lines (yellow lane lines), other than white lane lines. The luminance of colored lane lines is lower than that of white lane lines. Accordingly, a lane line may not be detected, depending on the travel circumstances such as travel over a concrete road of comparatively high luminance, in which a sufficient luminance difference between the road surface and the lane line cannot be obtained, or the luminance of the lane line is lower than the road surface luminance.

Herein, detection based on a color difference image is effective in order to detect colored lane lines stably. For instance, it is effective to detect orange lane lines based on a V image (R-G) or a U image (B-G).

Although the precision of detection of colored lane lines can be enhanced through detection based on a color difference image, the detection precision of white lane lines in that case is lower than when the lane line is detected based on a luminance image. It would be accordingly conceivable to execute both detection based on a luminance image and detection based on a color difference image, for a shared image portion, in order to detect appropriately both a white lane line and a colored lane line (for example, see Japanese Patent No. 4365350).

However, performing two types of lane line detection for a shared image portion brings an increase in the processing load, which is undesirable.

The incidence of colored lane lines is usually smaller than that of white lane lines, and, accordingly, performing at all times lane line detection based on a color difference image together with lane line detection based on a luminance image also brings a undesirable increase in the processing load.

SUMMARY OF THE INVENTION

The present invention has been designed in consideration of the circumstances described above, and an object thereof is to provide an image processing apparatus that is capable of properly detect both white lane lines and colored lane lines, while reducing processing load.

An aspect of the present invention provides an image processing apparatus including an imaging unit that obtains at least one captured image, as a color image, through imaging of a direction of travel of a vehicle equipped with the image processing apparatus; and a lane line detector that detects a lane line projected as a subject, on the basis of the captured image obtained by the imaging unit. The lane line detector is configured to execute, as a lane line detection processes targeted on a lane line search range set for the captured image, the lane line detection processes including a lane line detection process according to a first mode and a lane line detection process according to a second mode, the lane line detection process according to the first mode being configured to detect a lane line portion based on a luminance image for more than half of rows within the lane line search range and detect a lane line portion based on a color difference image for the other rows, and the lane line detection process according to the second mode being configured to detect a lane line portion based on the color difference image for a greater number of rows than in the first mode. The lane line detector executes a mode switchover control process of performing mode switchover determination between the first mode and the second mode on the basis of the number of rows in which a lane line portion of a predefined width or wider has been detected, from among the rows in which a lane line portion has been detected based on the color difference image, and performing mode switchover control based on the determination result.

Two of the lane line search ranges may be set spaced apart from each other, on the left and right within the captured image, and the lane line detector may execute the mode switchover control process for each lane line search range.

The interval between the rows in which a lane line portion is detected based on the color difference image in the first mode may be set to an interval corresponding to a constant distance in actual space.

In the second mode, the rows in which a lane line portion is detected based on the luminance image and the rows in which a lane line portion is detected based on the color difference image may be disposed alternately at every other row.

The imaging unit may obtain a pair of captured images through stereo-imaging of the direction of travel of the vehicle. The image processing apparatus may further comprise a parallax calculator that calculates a parallax of the subject on the basis of the pair of captured images obtained by the imaging unit. The lane line detector may perform the mode switchover determination in the mode switchover control process, on the basis of the number of rows in which a lane line portion of a predefined width or wider has been detected and in which a value of parallax of the detected lane line portion lies within a predefined range, from among the rows in which a lane line portion has been detected based on the color difference image.

As the mode switchover control process, the lane line detector may perform: the mode switchover determination for every frame; switchover control from the first mode to the second mode in response to a determination result of approving switchover, the determination result being obtained in the mode switchover determination; and switchover control from the second mode to the first mode in response to when the number of times that the determination result of approving switchover has been obtained in the mode switchover determination reaches a predefined count of the number of times that the determination result of approving switchover has been obtained in the mode switchover determination.

The lane line detector may perform the mode switchover determination in the mode switchover control process, on the basis of the number of rows in which a lane line portion of a predefined width or wider has been detected and in which a content of a predefined color component in the detected lane line portion is a predefined ratio or higher, from among the rows in which a lane line portion has been detected based on the color difference image.

DETAILED DESCRIPTION

1. Overall Configuration of the System

Figure 1:
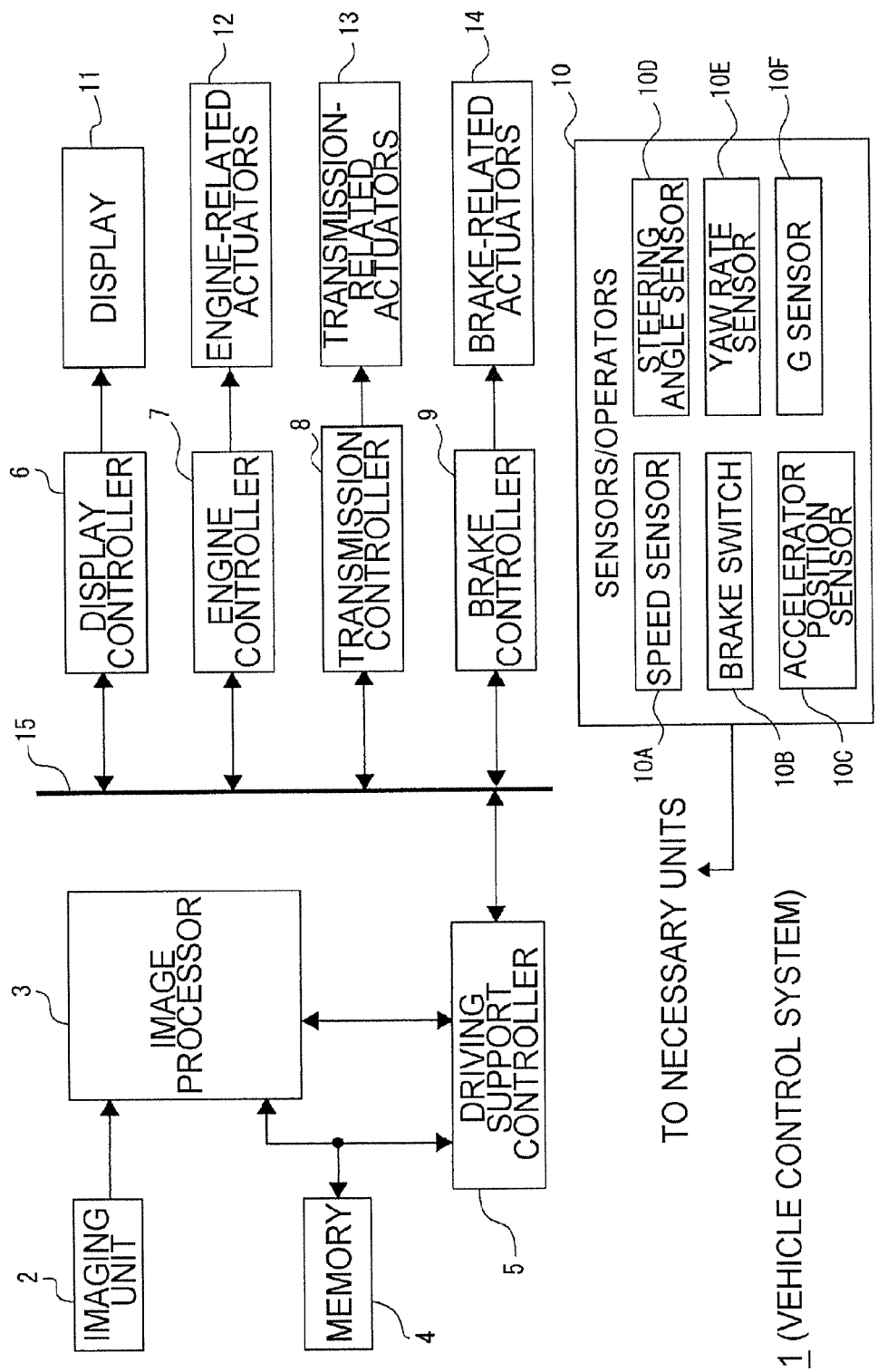
FIG. 1 is a diagram illustrating the configuration of a vehicle control system according to an implementation of the present invention.

FIG. 1 illustrates the configuration of a vehicle control system 1 including an image processing apparatus according to an implementation according to the present invention. FIG. 1 illustrates only the relevant parts of the configuration of the vehicle control system 1 that pertain mainly to the implementation.

The vehicle control system 1 includes an imaging unit 2, an image processor 3, a memory 4, a driving support controller 5, a display controller 6, an engine controller 7, a transmission controller 8, a brake controller 9, sensors/operators 10, a display 11, engine-related actuators 12, transmission-related actuators 13, brake-related actuators 14 and a bus 15, provided in a vehicle (hereinafter referred to as "subject vehicle").

The image processor 3 executes predefined image processing pertaining to recognition of a vehicle exterior environment, on the basis of captured image data that is obtained captured by the imaging unit 2, of the direction of travel of the subject vehicle (frontward, in the implementation). The image processor 3 performs image processing using, for instance, the memory 4 configured with a non-volatile memory or the like. The internal configuration of the imaging unit 2 and the concrete process executed by the image processor 3 will be described in detail later.

The driving support controller 5 includes a microcomputer that is provided with, for instance, a central processor (CPU), a read only memory (ROM) and a random access memory (RAM). The driving support controller 5 executes various control processes for driving support (hereafter, referred to as "driving support control process"), on the basis of, for instance, the results of image processing by the image processor 3, and on the basis of detection information and operation input information obtained by the sensors/operators 10.

The driving support controller 5 is connected, by way of the bus 15, to the various controllers that include a microcomputer, namely the display controller 6, the engine controller 7, the transmission controller 8 and the brake controller 9, such that these controllers can exchange data with one another. The driving support controller 5 executes an operation pertaining to driving support, by issuing instructions to the necessary controllers from among the above controllers.

The sensors/operators 10 designate collectively various sensors and operators that are provided in the subject vehicle. Sensors among the sensors/operators 10 include a speed sensor 10A that detects the speed of the subject vehicle, a brake switch 10B that is switched on and off in response to the operation or non-operation of a brake pedal, an accelerator position sensor 100 that detects an accelerator position on the basis of the amount of depression of an accelerator pedal, a steering angle sensor 10D that detects a steering angle, a yaw rate sensor 10E that detects a yaw rate, and a G sensor 10F that detects acceleration. Although not depicted in the figures, the sensors/operators 10 also includes other sensors such as an engine revolutions sensor, an intake air amount sensor that detects the amount of intake air, a throttle opening sensor that is interposed in an intake passage and that detects the degree of opening of a throttle valve that adjusts the amount of intake air supplied to cylinders of the engine, a water temperature sensor that detects the temperature of cooling water, as an indicator of engine temperature, and an outside air temperature sensor that detects the temperature or air outside the vehicle.

Operators among the sensors/operators 10 include, for instance, an ignition switch for instructing start or stop of the engine, a select lever for instructing selection of automatic transmission mode/manual transmission mode in an automatic transmission (AT) vehicle, and instructing upshift/downshift during a manual transmission mode, and a display switching switch for switching display information in a multi function display (MFD) that is provided in the below-described display 11.

The display 11 encompasses collectively various MFDs and meters such as a speedometer, a tachometer and the like, provided in a meter panel that is disposed in front of the driver, as well as other display devices for presenting information to the driver. Herein, the MFD can display various information items such as total travel distance of the subject vehicle, outside air temperature, instantaneous fuel consumption and so forth, simultaneously or by switching between items.

The display controller 6 controls the display operation by the display 11 on the basis of, for instance, detection signals from predefined sensors and operation input information by the operators, among the sensors/operators 10. For instance, a predefined reminder message can be displayed at the display 11 (for instance, at a predefined region of the MFD), as a part of driving support, on the basis of an instruction from the driving support controller 5.

The engine controller 7 controls various actuators that are provided as the engine-related actuators 12, on the basis of, for instance, detection signals from predefined sensors and operation input information from operators among the sensors/operators 10. The engine-related actuators 12 include actuators pertaining to engine driving such as a throttle actuator that drives a throttle valve, and an injector for fuel injection.

For instance, the engine controller 7 performs start/stop control of the engine in response to the operation of the above-described ignition switch. The engine controller 7 controls, for instance, fuel injection timing, fuel injection pulse width, throttle opening and the like, on the basis of detection signals from predefined sensors such as the engine revolutions sensor and the accelerator position sensor 10C.

The transmission controller 8 controls various actuators that are provided as the transmission-related actuators 13, on the basis of, for instance, detection signals from predefined sensors and operation input information from operators among the sensors/operators 10. The transmission-related actuators 13 include actuators relating to transmission such as a control valve that performs shift control in an automatic transmission, and a lock-up actuator that operates a lock-up clutch.

For instance, the transmission controller 8 performs shift control by outputting, to a control valve, a shift signal in accordance with a predefined shift pattern, when an automatic transmission mode is selected with the above-described select lever.

When a manual transmission mode is set, the transmission controller 8 performs shift control by outputting, to the control valve, a shift signal according to an upshift/downshift instruction through the select lever.

The brake controller 9 controls various actuators that are provided as the brake-related actuators 14, on the basis of, for instance, detection signals from predefined sensors and operation input information from operators among the sensors/operators 10. The brake-related actuators 14 includes actuators relating to braking, for instance a hydraulic control actuator for controlling the output fluid pressure from a brake booster to a master cylinder, and for controlling fluid pressure within brake fluid piping. For instance, the brake controller 9 brakes the subject vehicle by controlling the hydraulic control actuator when the driving support controller 5 issues a brake-on instruction. Further, the brake controller 9 realizes so-called Antilock Brake System (ABS) control by calculating a slip ratio of the wheels on the basis of detection information by a predefined sensor (for instance, an axle rotational speed sensor, or the vehicle speed sensor 10A), and by increasing and reducing fluid pressure, with the above hydraulic control actuator, in accordance with the calculated slip ratio.

2. Image Processing Executed in the Implementation

The image processing executed in the implementation will be described with reference to FIG. 2.

Figure 2:
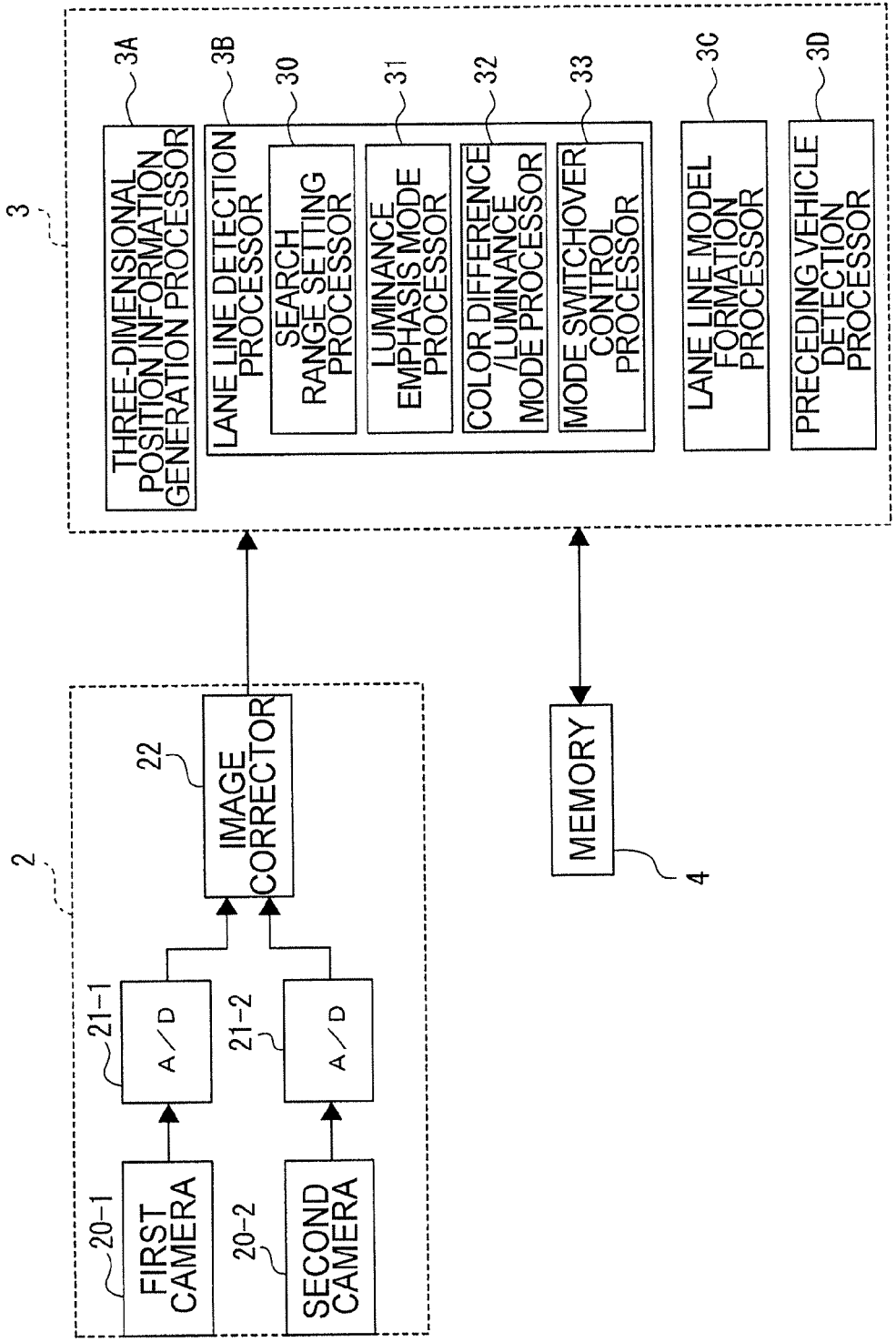
FIG. 2 is a diagram illustrating image processing that is executed according to the implementation.

For description of image processing, FIG. 2 illustrates the internal configuration of the imaging unit 2 and of the memory 4 depicted in FIG. 1 together with the configuration of the image processor 3. The imaging unit 2 for obtaining the captured image data that is used in image processing will be described in brief first.

The imaging unit 2 is provided with a first camera 20-1, a second camera 20-2, an A/D converter 21-1, an A/D converter 21-2 and an image corrector 22.

The first camera 20-1 and the second camera 20-2 are each configured with a camera optical system and an imaging element such as a charge coupled device (CCD) and a complementary metal oxide semiconductor (CMOS). Subject images are formed, by the camera optical system, on the imaging plane of the imaging element, and electric signals corresponding to the intensity of received light is obtained in pixel units in the imaging element.

The first camera 20-1 and the second camera 20-2 are disposed so as to enable ranging by so-called stereo-imaging. That is, the cameras are disposed in such a manner that there is obtained a plurality of captured images of different viewpoints. The first camera 20-1 and the second camera 20-2 in implementation are disposed in the vicinity of the top of the windshield of the subject vehicle, and are spaced apart from each other by a predefined distance in the vehicle width direction. The optical axes of the first camera 20-1 and the second camera 20-2 are parallel, and the focal lengths are set to substantially a same value. The frame periods of the cameras are synchronous, and the frame rates as well match each other.

The electric signal obtained in the imaging element of the first camera 20-1 is supplied to, and undergoes A/D conversion in, the A/D converter 21-1, and the electric signal obtained in the imaging element of the second camera 20-2 is supplied to, and undergoes A/D conversion in, the A/D converter 21-2. As a result there are obtained digital image signals (image data) that denote luminance values, according to a predefined gradation, in pixel units. In the implementation, the first camera 20-1 and the second camera 20-2 can obtain color captured images in R (red), G (green) and B (blue). The above luminance values are obtained in the form of a value respectively corresponding to R, G and B. In the case of the implementation, the effective pixel count of the imaging elements of the first camera 20-1 and the second camera 20-2 is set, for instance, to about 1280 pixels in the horizontal direction×about 960 pixels in the perpendicular direction.

The image corrector 22 receives image data (hereafter, referred to as "first captured image data") based on images captured by the first camera 20-1 and obtained via the A/D converter 21-1, and of image data (hereafter, notated as "second captured image data") based on images captured by the second camera 20-2 and obtained via the A/D converter 21-2. The image corrector 22 corrects, in the first captured image data and the second captured image data, offset caused by the mounting positional error of the first camera 20-1 and the second camera 20-2, for instance by affine conversion. The image corrector 22 also performs the correction of the luminance values of the first captured image data and the second captured image data, including noise removal and so forth.

The image processor 3 records and stores, in the memory 4, the first captured image data and the second captured image data obtained in the imaging unit 2.

The image processor 3 is configured with, for instance, a microcomputer, and executes, in accordance with an invoked program, various image processing items based on the first captured image data and the second captured image data.

FIG. 2 illustrates the image processing items executed by the image processor 3, in the form of respective separate blocks for each function. Divided broadly into functions, as illustrated in the figure, the image processor 3 has a three-dimensional position information generation processor 3A, a lane line detection processor 3B, a lane line model formation processor 3C and a preceding vehicle detection processor 3D.

The three-dimensional position information generation processor 3A executes a three-dimensional position information generation process to generate three-dimensional position information on the basis of the first captured image data and the second captured image data that are stored in the memory 4. Specifically, the three-dimensional position information generation process involves: detecting, by pattern matching, corresponding points between the first captured image data and the second captured image data (i.e. pair of stereo-captured image data items); calculating, as a parallax dp, a coordinate shift between detected corresponding points; and generating, as three-dimensional position information, information on the position of the corresponding points in actual space, using the parallax dp, in accordance with the principles of triangulation.

To calculate the coordinate shift as such parallax dp, one from among the first captured image data and the second captured image data is established beforehand as a "reference image", and the other as a "comparison image". In order to enable calculation of the parallax dp for an object positioned at the horizontal-direction end on the reference image, the comparison image is generated in the form of an image having a greater number of pixels in the horizontal direction than that of the reference image.

Herein, the three-dimensional position information is expressed by a point (X, Y, Z) in space taking the point immediately below the middle between the pair of cameras (first camera 20-1 and second camera 20-2) as the origin, the X-axis as the direction in which the pair of cameras are joined, the Y-axis as the top-down direction, and the Z-axis as the front-rear direction.

The values of X, Y, Z, as the three-dimensional position information, are represented by (i, j) as pixel coordinates, where the i-axis is an axis parallel to the horizontal direction in the reference image and the j-axis is an axis parallel to the perpendicular direction, and are worked out on the basis of coordinate conversion given by Expressions (1) to (3) below, where CD denotes the spacing of the pair of cameras, PW denotes the viewing angle per pixel, CH denotes the mounting height of the pair of cameras, and IV and JV respectively denote the i-coordinate and the j-coordinate, on the reference image, of a point at infinity ahead of each camera.

$$X=CD/2+Z \times PW \times (i-IV) \quad \text{(Expression 1)}$$

$$Y=CH+Z \times PW \times (j-JV) \quad \text{(Expression 2)}$$

$$Z=CD/\{PW \times (dp-DP)\} \quad \text{(Expression 3)}$$

The term "DP" in Expression (3), which is referred to as vanishing point parallax or infinity-corresponding point, is in essence a value established so that the parallax dp of corresponding points between the reference image and the comparison image, and a respective distance Z up to the corresponding point in actual space, satisfy Expression (3) above. Hereafter, "DP" will be referred to as "parallax offset value DP".

A lane line detection process executed by the lane line detection processor 3B detects a lane line (lane line projected as the subject) that is formed on the road surface and along which the subject vehicle is traveling, on the basis of the reference image (i.e. the image data set beforehand, from among the first captured image data and the second captured image data) and the three-dimensional position information generated in the three-dimensional position information generation process (including the distance Z of each pixel as the corresponding point).

The lane line detection process implementation will be described in detail further on.

A lane line model forming process executed by the lane line model formation processor 3C forms a lane line model in a three-dimensional space defined by the X, Y and Z axes, on the basis of information (lane line candidate points) on a lane line as detected in the lane line detection process above. Specifically, the lane line model in three-dimensional space is formed through linear approximation, for instance by least squares, of at least the start position ds from among a start position ds and an end position de (each detected in three-dimensional position information by (X, Y, Z)), of a lane line that is detected for each row (each horizontal line) in the lane line detection process, as described below. Height information on the road surface on which the subject vehicle travels is also obtained from the lane line model thus formed.

A preceding vehicle detection process executed by the preceding vehicle detection processor 3D detects a preceding vehicle that is present in front of the subject vehicle, on the basis of the reference image and the three-dimensional position information. Firstly, the preceding vehicle detection process performs an object detection process on the basis of the three-dimensional position information to detect the object that is present within the image, including information on the distance Z up to the object. The object detection process generates, for instance, a distance image in which corresponding points, detected in the preceding calculation process of parallax dp, are represented, on the image, mapped to respective values of distance Z; splits the distance image into a plurality of vertical regions that partition the distance image in the vertical direction; creates a distance histogram that denotes the distance distribution in the image vertical direction (j-direction), for each vertical region, such that the distance Z of a position (corresponding point) of maximal frequency constitutes a representative distance of an object that is present within the respective vertical region. For corresponding points of a frequency maximum in which a representative distance is obtained, pixel ranges deemed to be of one same object are grouped, on the basis of a relationship such as the direction and distance Z up to contiguous corresponding points, to specify a range of each three-dimensional object present in the image. As a result the object that is present within the image is detected, including information on the distance Z up to the object.

The distance image is sequentially obtained for each frame. In the preceding vehicle detection process, information on the distance Z up to the object to be detected is monitored over a plurality of frames, to extract thereby, as a preceding vehicle, an object that is present on the travel road of the subject vehicle and that moves with a predefined speed in substantially the same direction as that of the subject vehicle. This is performed in conjunction with pattern matching relying on the reference image (for instance, pattern matching based on features of vehicles, such as brake lamps), in order to suppress erroneous detection of objects other than vehicles.

When a preceding vehicle is detected, preceding vehicle recognition information is calculated, and stored, in the form of preceding vehicle distance (=vehicle-to-vehicle distance with respect to the subject vehicle), preceding vehicle speed (=rate of change of vehicle-to-vehicle distance+subject vehicle speed) and preceding vehicle acceleration (=differential value of the preceding vehicle speed).

The techniques involved in the preceding vehicle detection process above are identical to those described in Japanese Unexamined Patent Application Publication (JP-A) No. 2012-66759, where the relevant details can be found.

The preceding vehicle detection processor 3D can detect replacing of the preceding vehicle. Herein, the feature replacing of the preceding vehicle denotes an instance in which another vehicle that replaces a preceding vehicle that was being detected is detected now as the preceding vehicle, for example if a preceding vehicle that was being detected moves off the front of the vehicle, and, as a result another vehicle that was ahead of the former preceding vehicle is newly detected as a preceding vehicle, or in a case where a third vehicle cuts in between a preceding vehicle that was being detected and the subject vehicle, whereupon the third vehicle is newly detected as a preceding vehicle.

3. Lane Line Detection Process in an Implementation

The lane line detection process executed by the lane line detection processor 3B will be described next in detail.

Divided broadly into functions, the lane line detection processor 3B has a search range setting processor 30, a luminance emphasis mode processor 31, a color difference/luminance mode processor 32 and a mode switchover control processor 33, as illustrated in FIG. 2.

The search range setting processor 30 executes a search range setting process to set a lane line search range sa as a range within which a lane line is to be searched within the reference image. In the implementation, two lane line search ranges sa are set, namely a right lane line search range saR disposed on the right side within the image, and a left lane line search range saL disposed on the left side.

Figure 3A:
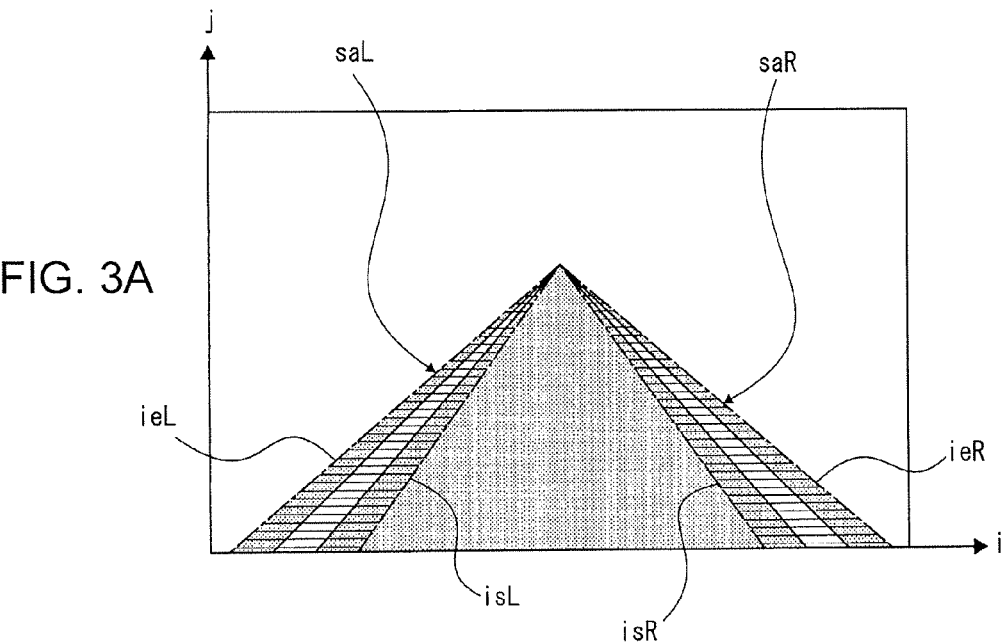
FIGS. 3A and 3B illustrate a lane line search range.

In the case where no lane line is detected, the right lane line search range saR and the left lane line search ranges saL such are set in the search range setting process as illustrated in FIG. 3A. In the case where no lane line is detected, a comparatively wide range is set for the right lane line search range saR and the left lane line search range saL, so as to encompass a range within which the right lane line can be expected to be projected and a range within which the left lane line can be expected to be projected, respectively. Specifically, a comparatively wide width from a search start position isR up to a search end position ieR is set as the right lane line search range saR, and a comparatively wide width from a search start position isL up to a search end position ieL is set as the left lane line search range saL.

The reason for setting the left side as the search start position isR and the right side as the search end position ieR, for the right lane line search range saR, is that lane line search (search of a peak value described below) in the right lane line search range saR is performed from the left to the right. The reason why the right side of the left lane line search range saL is referred to as the search start position isL, and the left side is referred to as the search end position ieL, is that, conversely, lane line search in the left lane line search range saL is performed from the right to the left. As can thus be understood, the search directions in the respective lane line search ranges sa are directions moving away from the center of the subject vehicle.

In the case where a lane line is detected, each lane line search range sa is set, in the search range setting process, taking the start position ds and the end position de of lane lines as a reference.

Figure 3B:
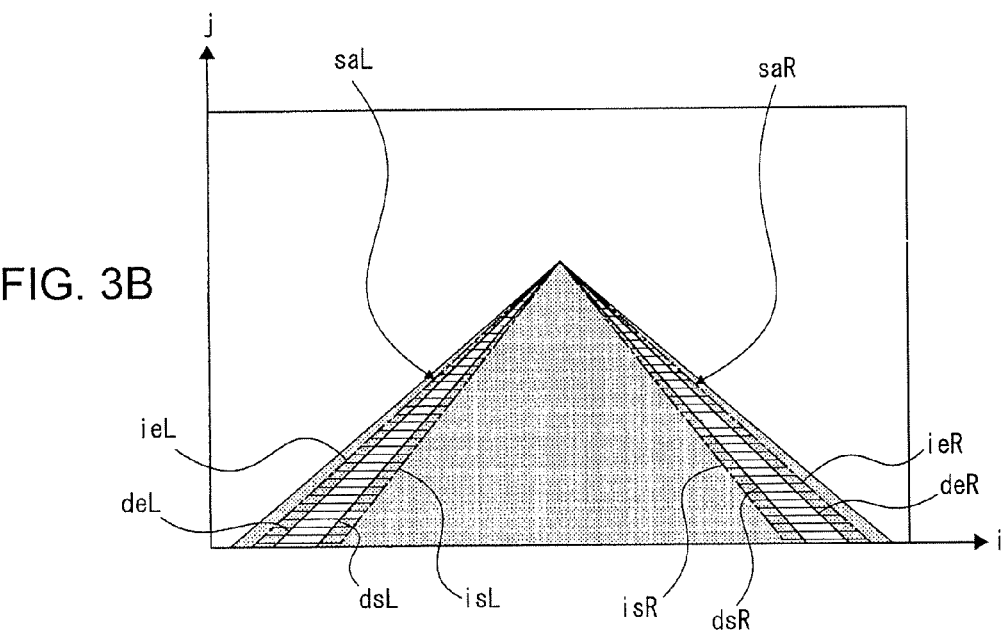

FIG. 3B illustrates an example where the right lane line search range saR and the left lane line search range saL are set corresponding to an instance where lane lines for both the right side and the left side are detected.

In the right lane line search range saR in this case, a position that is offset towards the left by a predefined number of pixels, from the start position dsR of the detected lane line, on the right, is set as the search start position isR, and a position offset towards the right by a predefined number of pixels, from an end position deR of the detected lane line, on the right, is set as the search end position ieR.

In the left lane line search range saL that is set in this case, a position offset towards the right by a predefined number of pixels, from a start position dsL of the detected lane line, on the left, is set as the search start position isL, and a position offset towards the left by a predefined number of pixels, from an end position deL of the detected lane line, on the left, is set as the search end position ieL.

The width of each lane line search range sa is set to be substantially constant in actual space, and hence the offset that is imparted to the start position ds and the end position de of a lane line is set to be variable with the distance Z (to be narrower with increasing distance). Specifically, the offset tends to decrease as the j value of the row (horizontal line) increases.

Referring to FIG. 2, the luminance emphasis mode processor 31 executes a luminance emphasis mode process to detect a lane line portion based on a luminance image, for more than half of the rows within the lane line search range sa, and to detect a lane line portion based on a color difference image, for the other rows.

Figure 4A:
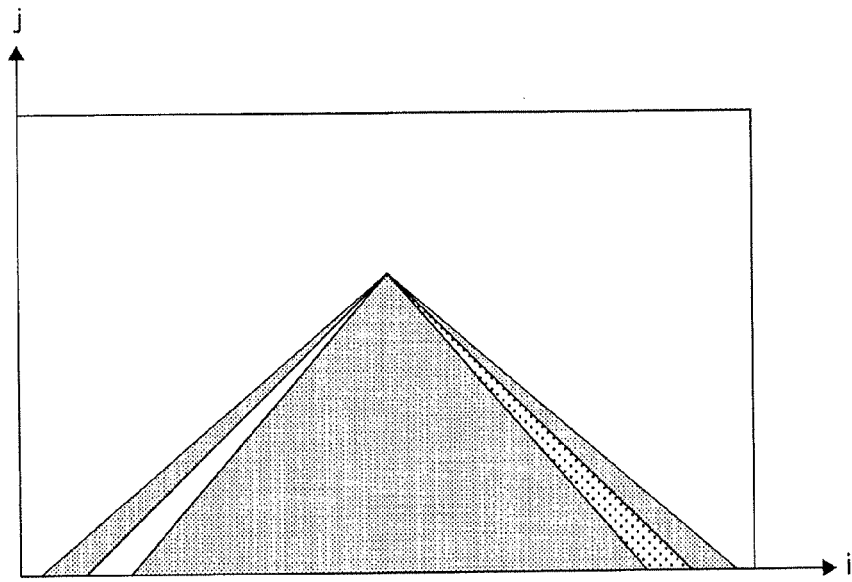
FIGS. 4A and 4B each illustrate a captured image in the case where a white lane line is formed on the left side and a colored lane line is formed on the right side, on a road surface.
Figure 4B:
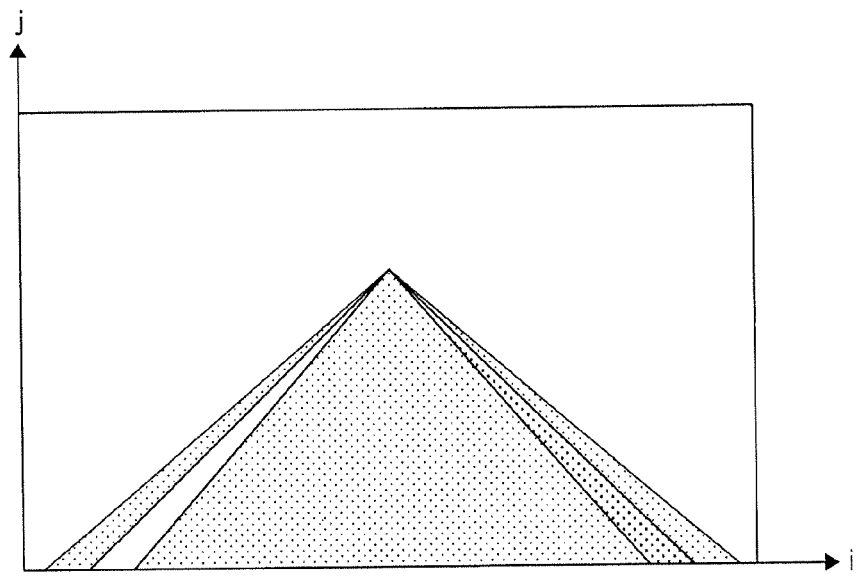

As described above, lane lines include not only white lane lines, but also colored lane lines such as orange lane lines (yellow lane lines). FIG. 4A and FIG. 4B illustrate examples of captured images in cases where a white lane line is formed on the road surface, on the left side, and a colored lane line, such as an orange lane line, is formed on the right side. In the example illustrated in FIG. 4A, for instance, the luminance of the white lane line is greater than the road surface luminance, while the luminance of the colored lane line is comparable to the road surface luminance. In the example illustrated in FIG. 4B, the luminance of the white lane line is greater than the road surface luminance, but the luminance of the colored lane line is lower than the road surface luminance.

Thus, colored lane lines are captured, in some instances, with the luminance of the colored lane line being comparable to, or lower than, the road surface luminance. The cases in FIG. 4A and FIG. 4B can occur, to a sufficient degree, under actual travel environments in which, for instance, the road surface luminance is comparatively high, for example during travel on concrete roads, or travel environments in which the hue of the colored lane line is comparatively dark (for example, in cases where there is no paint) and the luminance of the colored lane line is thus comparatively low.

When performing lane line detection based on a luminance image, a white lane line can be detected in a travel environment such that the luminance of the colored lane line is comparable to, or lower than, the road surface luminance, as in FIG. 4A and FIG. 4B, but it is not possible to detect appropriately a colored lane line in such a case.

As described above, detecting a colored lane line based on a color difference image is effective, but executing both detection based on a luminance image and detection based on a color difference image, for a shared image portion, in order to detect appropriately both a white lane line and a colored lane line, entails a greater processing load, and is accordingly undesirable.

The incidence of colored lane lines is usually lower than that of white lane lines, and, accordingly, performing at all times lane line detection based on a color difference image together with lane line detection based on a luminance image is likewise undesirable, in terms of the increased processing load that is incurred thereby.

In the implementation, a lane line detection process by a luminance emphasis mode, such as the above-described one, is performed as an initial mode in the lane line detection process.

Figure 5A:
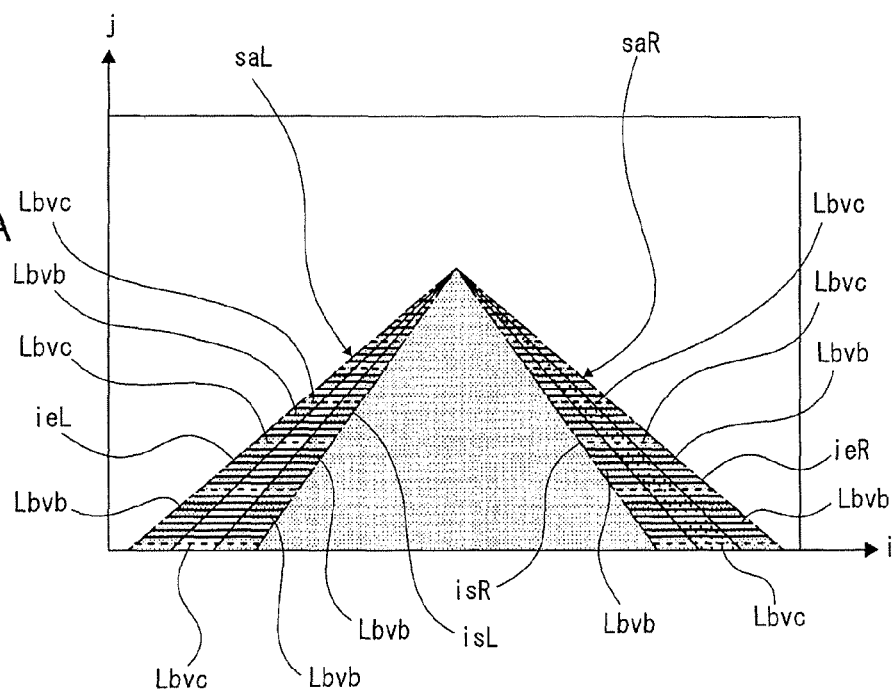
FIGS. 5A and 5B illustrate a luminance emphasis mode and a color difference/luminance mode.

FIG. 5A illustrates the luminance emphasis mode.

In the luminance emphasis mode, firstly, rows in which a lane line portion is detected on the basis of a luminance image are set as luminance-emphasis luminance rows Lbvb (denoted by thick solid lines in the figure), and rows in which a lane line portion is detected on the basis of a color difference image are set as luminance-emphasis color difference rows Lbvc (denoted by thick broken lines in the figures), for the right lane line search range saR and for the left lane line search range saL.

In the case of the implementation, the luminance-emphasis color difference rows Lbvc are disposed in such a manner that the intervals between rows correspond to a constant distance (for instance, 2 m intervals) in actual space. That is, the intervals between the luminance-emphasis color difference rows Lbvc tend to become narrower the higher the rows are within the image.

On the other hand, the luminance-emphasis luminance rows Lbvb are set as rows other than the rows that are set as the luminance-emphasis color difference rows Lbvc. In this case, the intervals of the luminance-emphasis color difference rows Lbvc are set in such a manner that at least the number of luminance-emphasis luminance rows Lbvb is greater than the number of the luminance-emphasis color difference rows Lbvc.

In the implementation, an edge image of any one of an R image, a G image and a B image is used to detect a lane line portion based on a luminance image, as performed for the luminance-emphasis luminance rows Lbvb. An edge image of the G image is used in the implementation.

To detect a lane line portion based on a luminance image, peak detection of an edge value is performed, from a search start position is up to a search end position ie, for a target row within the edge image of the G image. Specifically, in the case where the right lane line search range saR is the target, a respective peak position of an edge value is detected, from the search start position isR up to the search end position ieR, in a target row. In the case where the left lane line search range saL is the target, a peak position of a respective edge value is detected, from the search start position isL up to the search end position ieL, in a target row.

In this case, if part (lane line portion) of the white lane line is projected within a range extending from the search start position is up to the search end position ie in the target row, the start position ds and the end position de of the lane line portion are detected through detection of the relevant peak position. In detection of lane line portions based on a luminance image, information on the respective start position ds and end position de is calculated in the form of three-dimensional position information.

The lane line model formation processor 3C described above forms a lane line model using information on at least the start position ds, from among the start position ds and the end position de thus calculated.

An edge image of either one of color difference images U(B-G) and V(R-G) is used to detect a lane line portion based on a color difference image. In the implementation an edge image of a U image (B-G) is used.

The method for detecting a lane line portion based on a color difference image is identical to the method for detecting a lane line portion based on a luminance image described above, except that now the detection of the peak position of an edge value is applied to the luminance-emphasis color difference rows Lbvc in a color difference image. Accordingly, a recurrent description of the method will be omitted.

By virtue of such a luminance emphasis mode it becomes possible to detect a lane line portion of a white lane line by performing detection based mainly on a luminance image. At the same time, it becomes possible to check the presence or absence of a lane line portion of a colored lane line, if any such appears, by combining lane line detection with detection based on a color difference image, in part of the lane line search range.

The information on the start position ds and the end position de of the lane line, obtained through detection in the luminance-emphasis color difference rows Lbvc, in the luminance emphasis mode, is used for mode switchover determination by the mode switchover control processor 33 described below.

A color difference/luminance mode process performed by the color difference/luminance mode processor 32 will be described next.

The color difference/luminance mode process detects a lane line portion based on a color difference image for a greater number of rows than during the luminance emphasis mode.

Figure 5B:
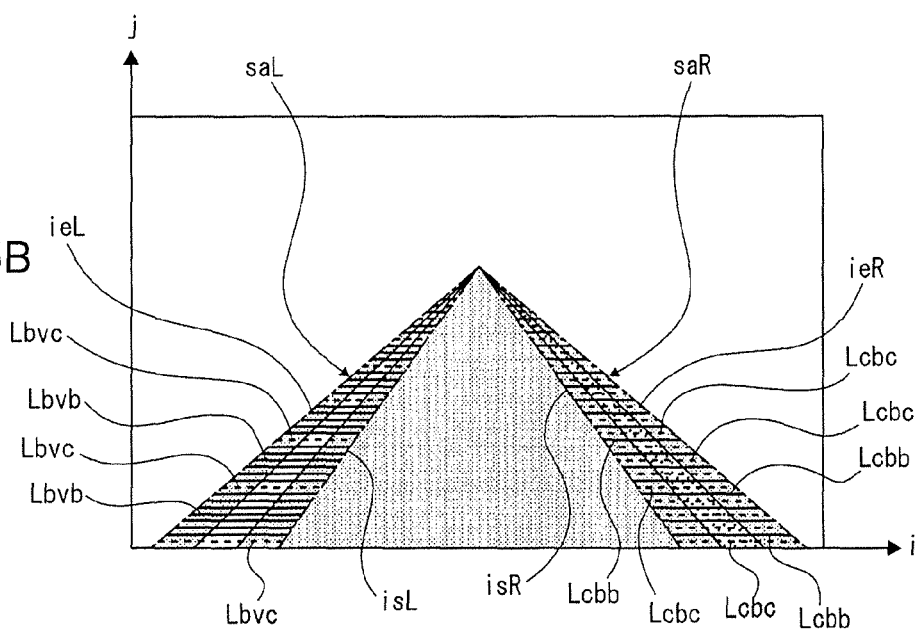

FIG. 5B illustrates the color difference/luminance mode, and depicts an instance in which t a lane line detection process according to the color difference/luminance mode is performed on the right lane line search range saR side.

In the color difference/luminance mode, rows in which a lane line portion is detected on the basis of a luminance image are set as luminance rows at color difference/luminance Lcbb (denoted by thick solid lines in the figure), and rows in which a lane line portion is detected on the basis of a color difference image are set as color difference rows at color difference/luminance Lcbc (denoted by thick broken lines in the figure), for the right lane line search range saR and for the left lane line search range saL.

In the color difference/luminance mode of the implementation, the luminance rows at color difference/luminance Lcbb and the color difference rows at color difference/luminance Lcbc are disposed alternately at every other row, as illustrated in the figure. Accordingly, the number of rows in which a lane line portion is detected based on a color difference image is now greater than in the luminance emphasis mode.

The method for detecting a lane line portion based on a luminance image and the method for detecting a lane line portion based on a color difference image in the color difference/luminance mode are identical to the methods described for the luminance emphasis mode, and hence will not be described again.

Figure 6:
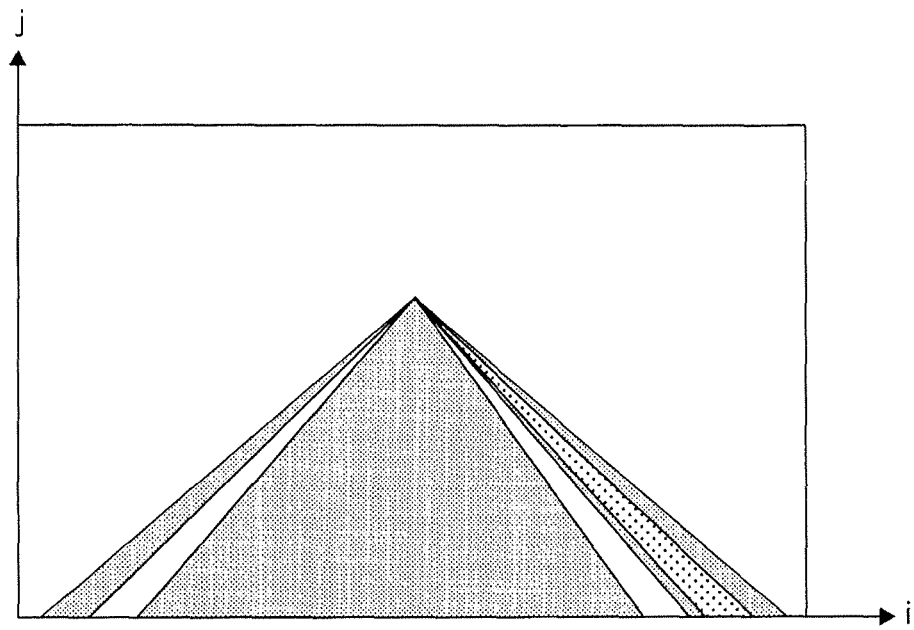
FIG. 6 illustrates a double line in which a white lane line and a colored lane line are formed close to each other.

By virtue of such color difference/luminance mode, a colored lane line can thus be detected properly by increasing the number of rows in which a lane line portion is detected based on a color difference image In the implementation, a white lane line can also be detected, together with a colored lane line, by alternately disposing the luminance rows at color difference/luminance Lcbb and the color difference rows at color difference/luminance Lcbc at every other row. The purpose of this is to enable detection of both lane lines (enabling formation of both lane line models) when a double line appears in which a white lane line and a colored lane line are disposed close to each other, as illustrated in FIG. 6.

The luminance emphasis mode process and the color difference/luminance mode process described above are executed repeatedly, for each frame, on the above-described reference image as the target.

A mode switchover control process executed by the mode switchover control processor 33 will be described next.

The mode switchover control process performs mode switchover determination between the luminance emphasis mode and the color difference/luminance mode, on the basis of the number of rows in which a lane line portion of a predefined width or wider has been detected, from among the rows in which a lane line portion has been detected based on a color difference image, and performs mode switchover control based on the determination result.

Specifically, in the case where the current mode is the luminance emphasis mode, the mode switchover control process determines, as a mode switchover determination, whether or not to switch over to the color difference/luminance mode, on the basis of the number of rows in which a lane line portion of the predefined width or wider has been detected, from among the luminance-emphasis color difference rows Lbvc.

In the implementation, it is determined whether the number of rows that satisfy both conditions below is equal to or greater than a predetermined rate α (for instance, equal to or greater than 80%) of the total number of luminance-emphasis color difference rows Lbvc within the target lane line search range sa:

(1) the width in actual space from the detected start position ds up to the end position de is a predefined width or wider; and (2) the value of parallax dp lies within a predefined range.

The "predefined width" in condition (1) set to a value corresponding to the width of the lane line in actual space. As condition (1) in the implementation, not only a lower limit value but also an upper limit value of width is set, to yield a condition "width in actual space from the detected start position ds up to the end position de lies within a predefined range".

In the mode switchover control process, control is performed in such a manner that the mode of the lane line detection process is switched from the luminance emphasis mode to the color difference/luminance mode, in response to an affirmative result being obtained in the above-described determination.

In the implementation, the mode switchover determination is performed for each frame, such that, if an affirmative result is obtained, the mode is switched to the lane line detection process according to the color difference/luminance mode, from the next frame.

In the case where the current mode is the color difference/luminance mode, the mode switchover control process determines whether or not to switch over to the luminance emphasis mode, on the basis of the number of rows in which a lane line portion of the predefined width or wider has been detected from among the color difference rows at color difference/luminance Lcbc. Specifically, in the implementation, the determination whether or not the number of rows that satisfy both conditions (1) and (2) above is smaller than a predetermined rate α (for instance, smaller than 80%) of the total number of color difference rows at color difference/luminance Lcbc is made for the color difference rows at color difference/luminance Lcbc.

Such mode switchover determination in the color difference/luminance mode is also executed repeatedly for each frame of the reference image.

In the implementation, in order to prevent hunting in mode switchover, mode switchover from the color difference/luminance mode to the luminance emphasis mode is suppressed over several frames, even if a determination result of approving mode switchover is obtained in the mode switchover determination. Specifically, upon the mode switchover determination in the color difference/luminance mode, switchover to the luminance emphasis mode is controlled in response to when the number of times that the affirmative result has been obtained reaches a predefined count.

4. Procedure

The specific procedure of the processes to be executed by the image processor 3 in order to realize functions the luminance emphasis mode process, the color difference/luminance mode process, and the mode switchover control process, will be described next with reference to flowcharts of FIGS. 7 and 8.

Figure 7:
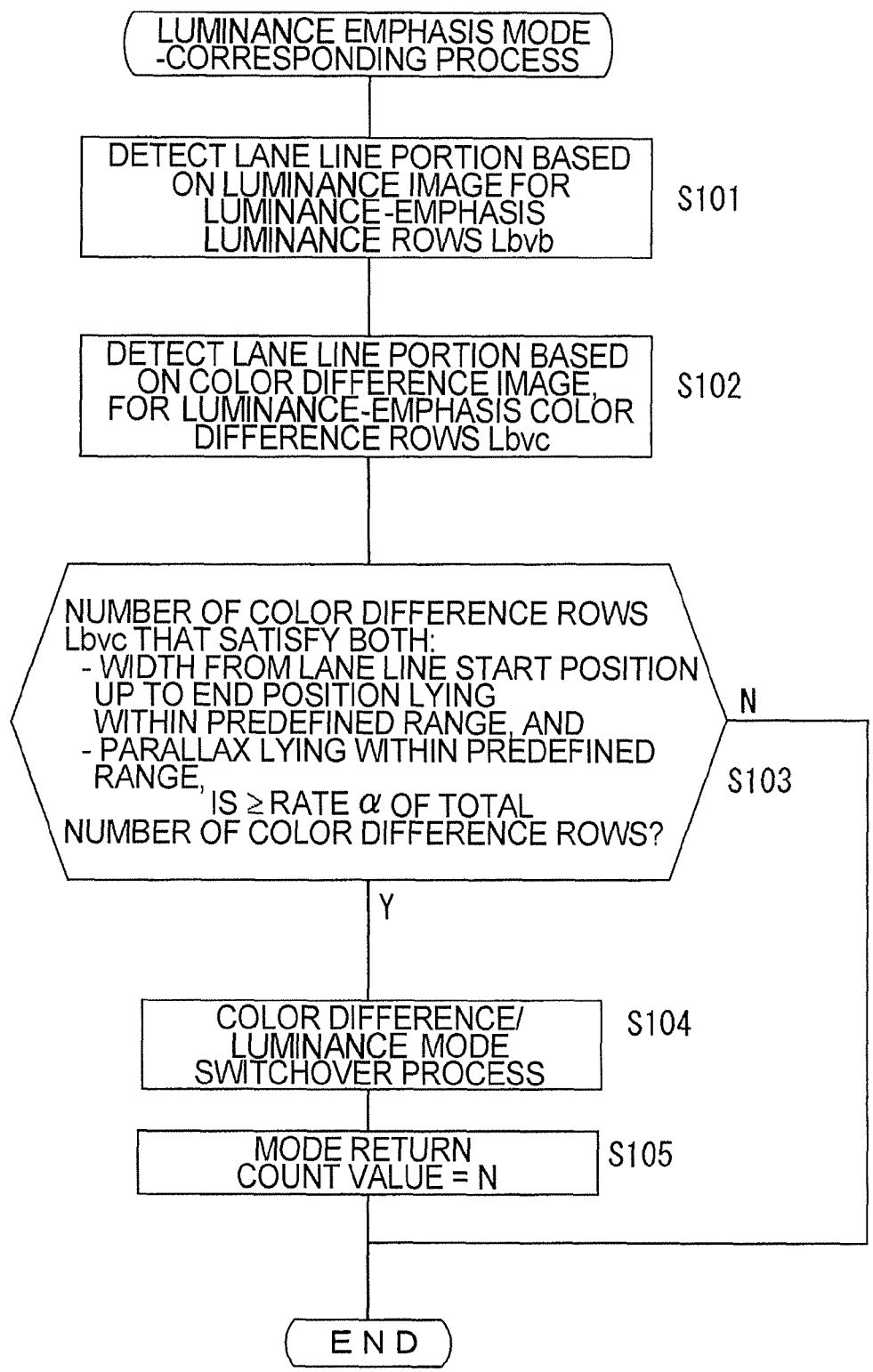
FIG. 7 is a flowchart of a process corresponding to a luminance emphasis mode.
Figure 8:
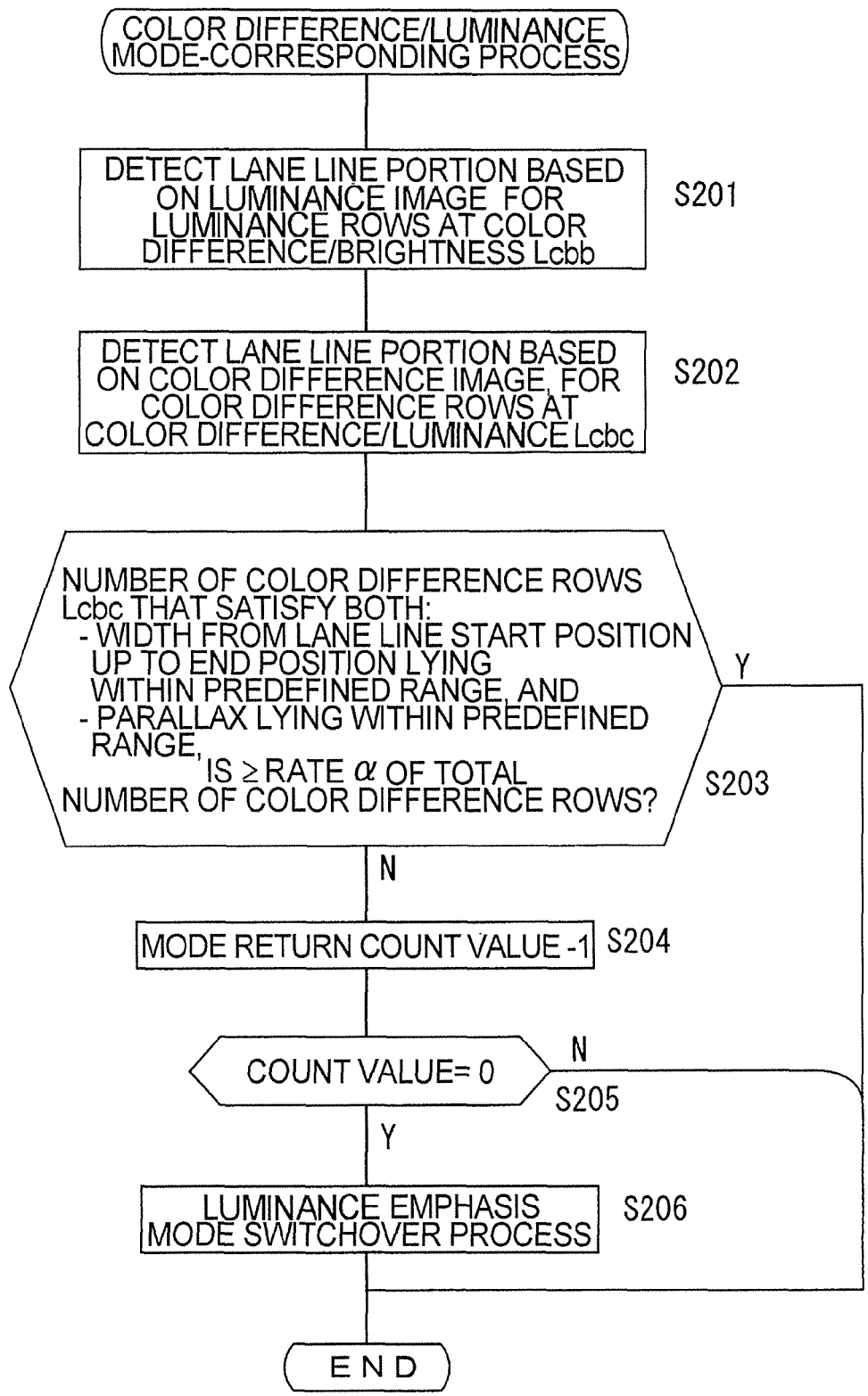
FIG. 8 is a flowchart of a process corresponding to a color difference/luminance mode.

FIG. 7 illustrates a luminance emphasis mode-corresponding process to be executed for the luminance emphasis mode, and FIG. 8 illustrates a color difference/luminance mode-corresponding process to be executed for the color difference/luminance mode.

The process illustrated in FIG. 7 is repeatedly executed for each frame of the reference image during the luminance emphasis mode, and the process illustrated in FIG. 8 is repeatedly executed for each frame of the reference image during the color difference/luminance mode. The processes illustrated in FIGS. 7 and 8 are executed for each of the right lane line search range saR and the left lane line search range saL.

Referring to FIG. 7, in step S101, firstly, the image processor 3 detects a lane line portion based on a luminance image, for the luminance-emphasis luminance rows Lbvb. Specifically, with the edge image of the G image as a target, a respective peak position of an edge value is detected within the range from the search start position is to the search end position ie for the luminance-emphasis luminance rows Lbvb lying within the lane line search range sa, in the each of the right lane line search range saR and the left lane line search range saL. As described above, if a lane line portion of a white lane line is present, the respective start position ds and end position de of the lane line are detected as the peak positions of the edge value.

In subsequent step S102, the image processor 3 detects a lane line portion based on a color difference image, for the luminance-emphasis color difference rows Lbvc. Specifically, with the edge image of the U image as the target, a peak position of an edge value is detected within a range from the search start position is to the search end position ie, for luminance-emphasis color difference rows Lbvc lying in the lane line search range sa on the side of interest. As described above, if a lane line portion of a colored lane line is present, the respective start position ds and end position de of the lane line are detected as the peak positions of the edge value.

Step S102 may be executed prior to S101.

In subsequent step S103, the image processor 3 determines, for the luminance-emphasis color difference rows Lbvc, whether or not the number of rows that satisfy both the conditions, i.e., that a width (width in actual space) of a lane line, from the start position ds up to the end position de, lies within a predefined range (condition corresponding to (1) above), and that the parallax dp lies within a predefined range (condition (2) above), is equal to or greater than a predetermined rate α (for instance, 80%) of the total number of luminance-emphasis color difference rows Lbvc.

When in step S103 the number of rows that satisfy both conditions above is equal to or greater than the predetermined rate α of the total number of luminance-emphasis color difference rows Lbvc, the image processor 3 proceeds to step S104 to perform a process to execute the color difference/luminance mode process from the next frame, as the color difference/luminance mode switchover process.

In subsequent step S105, the image processor 3 sets "N" as a mode return count value, and terminates the process illustrated in the figure. The mode return count value is a count value for preventing the above-described hunting. Herein the value of "N" is set to a natural number equal to or greater than 2.

When, in step S103, the number of rows that satisfy both conditions above is not equal to or greater than the predetermined rate α of the total number of luminance-emphasis color difference rows Lbvc, the image processor 3 bypasses steps S104 and S105, and terminates the process illustrated in the figure. That is, the luminance emphasis mode is maintained.

The process illustrated in FIG. 8 for the color difference/luminance mode will be described next.

Referring to FIG. 8, firstly, in step S201 of FIG. 8, the image processor 3 detects a lane line portion based on a luminance image for the luminance rows at color difference/luminance Lcbb, and in subsequent step S202, detects a lane line portion based on a color difference image for the color difference rows at color difference/luminance Lcbc.

The process in step S201 is identical to the process in the earlier step S101, except that now the process is applied to the luminance rows at color difference/luminance Lcbb. The process in step S202 is identical to the process the earlier step S102, except that now the process is applied to the color difference rows at color difference/luminance Lcbc. Therefore, a recurrent description will be omitted.

Step S202 may be executed prior to step S201.

In subsequent step S203, the image processor 3 determines, for the color difference rows at color difference/luminance Lcbc, whether or not the number of rows that satisfy both conditions i.e., a condition that a width (width in actual space) of a lane line, from the start position ds up to the end position de, lies within a predefined range (condition corresponding to (1) above), and a condition that the parallax dp lies within a predefined range (condition (2) above), is equal to or greater than a predetermined rate α (for instance, 80%) of the total number of color difference rows at color difference/luminance Lcbc.

When in step S203 the number of rows that satisfy both conditions above is equal to or greater than the predetermined rate α of the total number of color difference rows at color difference/luminance Lcbc, the image processor 3 terminates the process illustrated in the figure. That is, the color difference/luminance mode is maintained.

On the other hand, when in step S203 the number of rows that satisfy both conditions above is not equal to or greater than the predetermined rate α of the total number of color difference rows at color difference/luminance Lcbc, the image processor 3 proceeds to step S204 to set the mode return count value to −1, and then proceed to step S205 to determine whether or not the mode return count value is 0.

If the mode return count value is not 0, the image processor 3 terminates the process illustrated in the figure. On the other hand, if the mode return count value is 0, the image processor 3 proceeds to step S206 to perform a process to execute the luminance emphasis mode process from the next frame, as the luminance emphasis mode switchover process, and then terminate the process illustrated in the figure.

Accordingly, mode switchover is suppressed, without switchover to the luminance emphasis mode, until a determination result of approving mode switchover, in the mode switchover determination in step S203, is obtained N times (N frames in the implementation).

To prevent hunting in mode switchover, mode switchover may be suppressed until the determination result of approving mode switchover in the mode switchover determination in step S203 is consecutively obtained for a predefined number of times.

4. Summary of Implementation

As described above, the image processing apparatus (image processor 3) of the implementation includes an imaging unit (imaging unit 2) that obtains a captured image, as a color image, through imaging of the direction of travel of a subject vehicle; and a lane line detector (lane line detection processor 3B) that detects a lane line projected as a subject, on the basis of the captured image obtained by the imaging unit.

The lane line detector is configured to execute lane line detection processes targeted on a lane line search range (sa) that is set for the captured image, the lane line detection processes including a lane line detection process according to a first mode (luminance emphasis mode) and a lane line detection process according to a second mode, the lane line detection process according to the first mode (color difference/luminance mode) being configured to detect a lane line portion based on a luminance image for more than half of the rows within a lane line search range and detect a lane line portion based on a color difference image for the other rows, the lane line detection process according to the second mode being configured to detect a lane line portion based on the color difference image for a greater number of rows than in the first mode. The lane line detector executes a mode switchover control process of performing mode switchover determination between the first mode and the second mode on the basis of the number of rows in which a lane line portion of a predefined width or wider has been detected, from among the rows in which a lane line portion has been detected based on the color difference image, and performing mode switchover control based on the determination result.

In the first mode, it becomes possible to detect a lane line portion of a white lane line by performing detection based mainly on a luminance image, and at the same time, it becomes possible to check the presence or absence of a lane line portion of a colored lane line, if any such appears, by combining lane line detection with detection based on a color difference image. In the case where a colored lane line appears, the colored lane line can be detected properly by increasing the number of rows of detection based on a color difference image, through mode switchover from the first mode to the second mode as a result of the mode switchover control process.

In consequence, both white lane lines and colored lane lines can be properly detected without performing, for a same row, both detections based on a luminance image and detection based on a color difference image.

Therefore, it becomes possible to detect properly both white lane lines and colored lane lines, while reducing processing load.

In the image processing apparatus of the implementation, two of the lane line search ranges are set spaced apart from each other, on the left and right within the captured image. The lane line detector executes the mode switchover control process for each lane line search range.

Accordingly, it is possible to deal with both instances where a colored lane line is present on the right in the direction of travel, and instances where a colored lane line is present on the left.

In the image processing apparatus of the implementation, the interval between rows (Lbvc) in which a lane line portion is detected based on a color difference image in the first mode is set to an interval corresponding to a constant distance in actual space.

Accordingly, an appropriate sampling interval of the colored lane line can be performed, compared to, for instance, the case where a constant interval is set in the image space.

As a result, it becomes possible to perform properly mode switchover on the basis of appropriate sampling results.

In the second mode of the image processing apparatus of the present implementation, the rows (Lcbb) in which a lane line portion is detected based on a luminance image and the rows (Lcbc) in which a lane line portion is detected based on a color difference image are disposed alternately at every other row.

As a result, it becomes possible to properly detect both a white lane line and a colored lane line in cases where both types of lane line are present within a same lane line search range.

Therefore, it becomes possible to properly detect both a white lane line and a colored lane line in the case where, for instance, a double line appears such as the one illustrated in FIG. 6.

In the implementation, the imaging unit obtains a pair of captured images through stereo-imaging of the direction of travel of the subject vehicle, and the image processing apparatus of further includes a parallax calculator (three-dimensional position information generation processor 3A) that calculates the parallax of a subject on the basis of the pair of captured images obtained by the imaging unit. The lane line detector performs the mode switchover determination in the mode switchover control process, on the basis of the number of rows in which a lane line portion of a predefined width or wider has been detected and in which a value of parallax dp of the detected lane line portion lies within a predefined range, from among the rows in which a lane line portion has been detected based on the color difference image.

The lane line portion is presumed to be projected also on the other captured image from stereo-imaging (other captured image that is not the reference image), in that the value of the parallax dp of the detected lane line portion lies within a predefined range. Accordingly, if, as described above, the condition that the value of the parallax dp satisfies the condition of lying within a predefined range is set as the condition of mode switchover determination, it becomes possible to prevent an affirmative result from being obtained in the mode switchover determination through reaction to an erroneous detection of a lane line portion, due to, for instance, dirt or the like that is adhered to a camera on only one side (on the reference image side).

That is, it becomes possible to prevent inappropriate mode switchover due to erroneous detection of a lane line portion.

In the image processing apparatus of the implementation, as a mode switchover control process, the lane line detector performs the mode switchover determination for every frame; performs switchover control from the first mode to the second mode in response to a determination result of approving switchover being obtained in the mode switchover determination; and performs switchover control from the second mode to the first mode in response to when the number of times that the determination result of approving switchover has been obtained in the mode switchover determination reaches a predefined count.

In consequence, no immediate return to the first mode after switchover to the second mode occurs. Accordingly, it is possible to prevent hunting in mode switchover.

5. Variations

The implementation of the present invention has been described above, but the present invention is not limited to this, and may accommodate a number of conceivable variations.

For instance, in the second mode of the implementation (color difference/luminance mode), rows (Lcbb) in which a lane line portion is detected based on a luminance image and rows (Lcbc) in which a lane line portion is detected based on a color difference image are alternately disposed at every other row. However, rows in which a lane line portion is detected based on the color difference image may be disposed at all the rows within the lane line search range sa, in the case where, for example, it suffices to detect just the colored lane line, in a double line such as the one illustrated in FIG. 6. Herein it suffices to dispose, as the rows in which a lane line portion is detected based on the color difference image in the second mode, a number of rows equal to or greater than the number of rows in which a lane line portion is detected based on a luminance image, and such that a colored lane line can be detected (a lane line model can be formed).

Furthermore, for instance, mode switchover determination may use a color component of the lane line portion as a reference, instead of the width of the lane line portion or the parallax dp, described above. Specifically, the mode switchover determination can be performed on the basis of the number of rows in which a lane line portion of a predefined width or wider is detected, and in which the detected lane line portion has a content of a predefined color component that is a predefined ratio or higher, from among the rows in which a lane line portion has been detected based on the color difference image. Herein, the feature "content of a predefined color component" may refer to the content of a characteristic color component of the colored lane line of interest, for instance, the content of R component in an orange lane line. To determine whether or not the "content of a predefined color component in the detected lane line portion is a predefined ratio or higher", it suffices to determine whether or not the number of pixels having any one value of R value, G value and B value equal to or greater than a predefined value, from among the pixels that make up the lane line portion, is equal to or greater than a predefined numerical value.

By satisfying the condition that the content of a predefined color component of the lane line portion is a predefined ratio or higher, mode switchover determination is thus realized in which characteristics of the color of the colored lane line are also factored in.

The precision of the mode switchover determination can accordingly be yet further enhanced.

The invention claimed is:

1. An image processing apparatus, comprising:
an imaging unit that obtains at least one captured image, as a color image, through imaging of a direction of travel of a vehicle equipped with the image processing apparatus; and
a lane line detector that detects a lane line projected as a subject, on the basis of the captured image obtained by the imaging unit,
wherein the lane line detector is configured to execute lane line detection processes targeted on a lane line search range set for the captured image, the lane line detection processes including a lane line detection process according to a first mode and a lane line detection process according to a second mode, the lane line detection process according to the first mode being configured to detect a lane line portion based on a luminance image for more than half of rows within the lane line search range and detect a lane line portion based on a color difference image for rows other than the more than half of rows, the lane line detection process according to the second mode being configured to detect a lane line portion based on the color difference image for a greater number of rows than in the first mode, and
wherein the lane line detector executes a mode switchover control process of performing mode switchover determination between the first mode and the second mode on the basis of the number of rows in which a lane line portion of a predefined width or wider has been detected, from among the rows in which a lane line portion has been detected based on the color difference image, and performing mode switchover control based on the determination result.

2. The image processing apparatus according to claim 1, wherein
two of the lane line search ranges are set spaced apart from each other, on the left and right within the captured image, and
the lane line detector executes the mode switchover control process for each lane line search range.

3. The image processing apparatus according to claim 1, wherein
the interval between the rows in which a lane line portion is detected based on the color difference image in the first mode is set to an interval corresponding to a constant distance in actual space.

4. The image processing apparatus according to claim 2, wherein the interval between the rows in which a lane line portion is detected based on the color difference image in the first mode is set to an interval corresponding to a constant distance in actual space.

5. The image processing apparatus according to claim 1, wherein, in the second mode, the rows in which a lane line portion is detected based on the luminance image and the rows in which a lane line portion is detected based on the color difference image are disposed alternately at every other row.

6. The image processing apparatus according to claim 2, wherein, in the second mode, the rows in which a lane line portion is detected based on the luminance image and the rows in which a lane line portion is detected based on the color difference image are disposed alternately at every other row.

7. The image processing apparatus according to claim 1, wherein
the imaging unit obtains a pair of captured images through stereo-imaging of the direction of travel of the vehicle,
the image processing apparatus further comprises a parallax calculator that calculates a parallax of the subject on the basis of the pair of captured images obtained by the imaging unit, and
the lane line detector performs the mode switchover determination in the mode switchover control process, on the basis of the number of rows in which a lane line portion of a predefined width or wider has been detected and in which a value of parallax of the detected lane line portion lies within a predefined range, from among the rows in which a lane line portion has been detected based on the color difference image.

8. The image processing apparatus according to claim 2, wherein
the imaging unit obtains a pair of captured images through stereo-imaging of the direction of travel of the vehicle,
the image processing apparatus further comprises a parallax calculator that calculates a parallax of the subject on the basis of the pair of captured images obtained by the imaging unit, and
the lane line detector performs the mode switchover determination in the mode switchover control process, on the basis of the number of rows in which a lane line portion of a predefined width or wider has been detected and in which a value of parallax of the detected lane line portion lies within a predefined range, from among the rows in which a lane line portion has been detected based on the color difference image.

9. The image processing apparatus according to claim 1, wherein,
as the mode switchover control process, the lane line detector performs:
the mode switchover determination for every frame;
switchover control from the first mode to the second mode in response to a determination result of approving switchover, the determination result being obtained in the mode switchover determination; and
switchover control from the second mode to the first mode in response to when the number of times that the determination result of approving switchover has been obtained in the mode switchover determination reaches a predefined count.

10. The image processing apparatus according to claim 2, wherein,
as the mode switchover control process, the lane line detector performs:
the mode switchover determination for every frame; switchover control from the first mode to the second mode in response to a determination result of approving switchover, the determination result being obtained in the mode switchover determination; and
switchover control from the second mode to the first mode in response to when the number of times that the determination result of approving switchover has been obtained in the mode switchover determination reaches a predefined count.

11. The image processing apparatus according to claim 1, wherein
the lane line detector performs the mode switchover determination in the mode switchover control process, on the basis of the number of rows in which a lane line portion of a predefined width or wider has been detected and in which a content of a predefined color component in the detected lane line portion is a predefined ratio or higher, from among the rows in which a lane line portion has been detected based on the color difference image.

12. The image processing apparatus according to claim 2, wherein the lane line detector performs the mode switchover determination in the mode switchover control process, on the basis of the number of rows in which a lane line portion of a predefined width or wider has been detected and in which a content of a predefined color component in the detected lane line portion is a predefined ratio or higher, from among the rows in which a lane line portion has been detected based on the color difference image.

\* \* \* \* \*